3 50-276
CROSS REFERENCE
178
7,85
X2578

Oct. 20, 1959 D. W. PUGSLEY 2,909,770

TRANSMISSION SCREEN

Filed Nov. 25, 1953

Inventor:
Donald W. Pugsley,
by Merton D. Moore
His Attorney.

United States Patent Office 2,909,770

Patented Oct. 20, 1959

2,909,770

TRANSMISSION SCREEN

Donald W. Pugsley, Syracuse, N.Y., assignor to General Electric Company, a corporation of New York Continuation of application Serial No. 138,497, January 13, 1950. This application November 25, 1953, Serial No. 394,353

1 Claim. (Cl. 340—369)

This invention relates to transmission screens and, in particular, to the type screen that may be used for projection television receivers, movies, slide projectors, or other such devices.

This application is a continuation of my copending application entitled Transmission Screen, Ser. No. 138,-497, filed January 13, 1950, now abandoned, and assigned to the same assignee as the present application.

One of the major difficulties with present day types of transmission screens is that ambient light falling on a screen is reflected back into the observer's eyes, causing a loss in contrast of the observed picture. This is particularly objectionable in the case of projection television receivers, since the available light source for the picture is somewhat limited.

It is an object of this invention to provide an improved transmission screen.

It is a further object of this invention to provide a transmission screen in which the observer's view is not limited by ambient light.

Broadly, this invention comprises a transmission screen having a series of parallel grooves in the observing surface. Each groove has two intersecting surfaces, of which one is substantially perpendicular to the general focal plane of the screen and the other is at an angle substantially less than 90 degrees with such plane. The structure is such that ambient light is not reflected to the observer's eye from the transmission screen when the perpendicular surfaces are coated with a light absorbent substance.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

While, for the purpose of simplifying the illustration, the following description is directed primarily towards transmission screens such as those used in projection type television receivers, it is pointed out that this is not intended as a limitation on the scope of this invention but merely as an illustration of one application and that the invention may be used with any type of transmission screen, particularly external transmission screens where reflections from ambient light are normally encountered.

Figure 1:
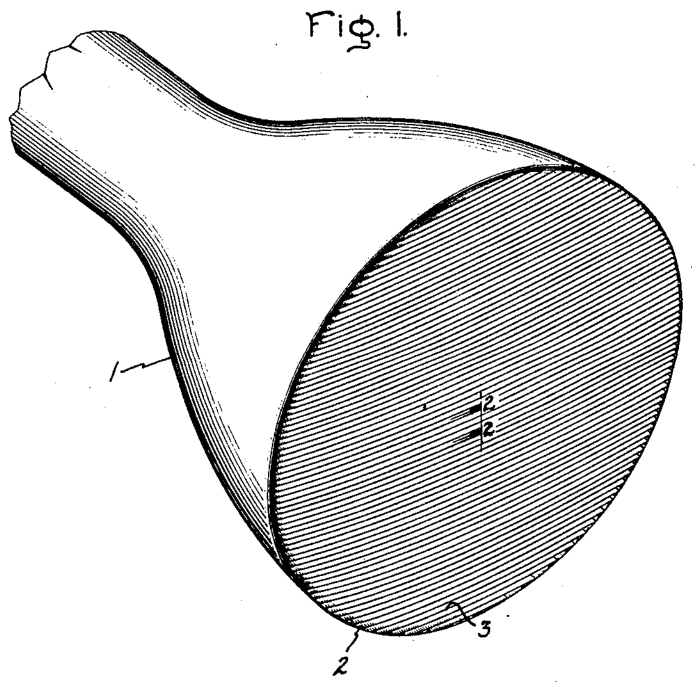
Figure 2:
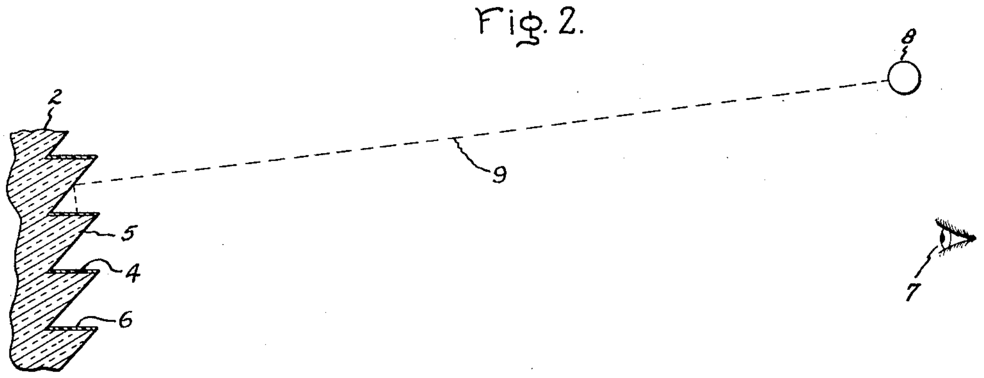

In the drawing, Fig. 1 is a front elevation view of a system employing a transmission screen, such as used in television receivers; while Fig. 2 is a diagrammatic view showing how ambient light is absorbed by this new improved transmission screen.

Referring to the drawing, a projection type cathode ray tube (or projector) 1 is shown with an optical system 2 and a transmission screen 3 which, in addition to having all the usual properties of transmission type screens is provided with a plurality of substantially horizontal V-shaped grooves, as shown in Fig. 2.

Each of the grooves comprises a surface or side 4, formed perpendicularly to the outer surface of the transmission screen, and an angle surface or side 5, which is preferably substantially at a 45 degree angle to the outer surface of the transmission screen. Each of the horizontal sides 4 connects two of the angle sides 5 to produce a transmission screen which, in profile, shows a saw-tooth effect at its outer or observing surface.

In a preferred embodiment, it has been found that if grooves are made about .015″ deep along the perpendicular side for a picture 15 to 18 inches high and if the angle side 5 is made at substantially a 45 degree angle, the reflection of ambient light is considerably diminished. The dimensions and angles described, however, are not critical and they may be altered substantially. The grooves may be straight or curved, depending upon the particular effect desired. In some instances, it has proven preferable to have the angles, dimensions or curvatures vary over the surface of the screen.

In each of these embodiments, however, the surfaces of perpendicular sides 4 are coated with a black or light-absorbent substance 6, such, for example, as dull black paint. This avoids multiple reflections and refractions which might otherwise cause some of the ambient light, initially reflected downwardly, from eventually coming back to the observer's eyes.

The operation of this improved television screen can best be understood from a reference to Fig. 2 of the drawing wherein a human eye 7 is shown at a distance from transmission screen 2. A source of ambient light, indicated at 8, sends off rays that are diagrammatically indicated at 9. Rays 9, as they strike the slanted surface 5 (by following the laws of reflection) are reflected downward to the light-absorbent surface 6. The light rays that initially strike the absorbent surface 6 naturally are not reflected towards the slanted surface 5. With this arrangement, ambient light is not reflected back into the observer's eyes. The contrast is not impaired by ambient light coming from above or on a level with the observer's eyes.

It is to be understood that light from the source which projects the image is focused on the diffusing surface as in a conventional prior art transmission screen. Light from the image picture is transmitted towards the observer, having a distribution pattern determined primarily by the degree and type of diffusion on the front surface. If the dimensions of the saw-tooth are small, such as those disclosed, the observer, at a normal viewing distance, is unable to distinguish them and the transmitted picture appears essentially the same as though the saw-teeth were not present.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

The combination of means for producing a real image in a predetermined image plane by scanning lines in sequence, a screen mounted so as to be between said plane and a position normally occupied by a viewer, said screen being comprised of a sheet of light-transmitting material having on the surface nearer the viewer a plurality of V-shaped grooves that are spaced closer together than the scanning lines in the image, each of said grooves having a pair of intersecting sides, a first of said sides intersecting said observing surface at an angle of substantially 90°, the second of said sides intersecting said observing surface at an angle substantially less than 90° and also intersecting the first side of an adjacent groove, and a coating of light-absorbing material on each of said first sides, whereby ambient light impinging on said grooves is not reflected by said screen, said sheet of transmitting material having the property of diffusing light falling thereon.

References Cited in the file of this patent

UNITED STATES PATENTS 1,970,358 Bull et al. ---------------- Aug. 14, 1934

2,348,818 Jacobson ---------------- May 16, 1944
2,364,369 Jelley et al. -------------- Dec. 5, 1944
2,567,656 Siezen ------------------ Sept. 11, 1951
2,651,234 Corso ------------------ Sept. 8, 1953

FOREIGN PATENTS 11,054 Great Britain ---------------- of 1908
419,801 Italy --------------------- Apr. 8, 1947